Feb. 21, 1950     J. A. BOWER     2,498,149
TREATMENT OF MOLDS FOR MAKING CERAMIC WARE
Filed April 30, 1946
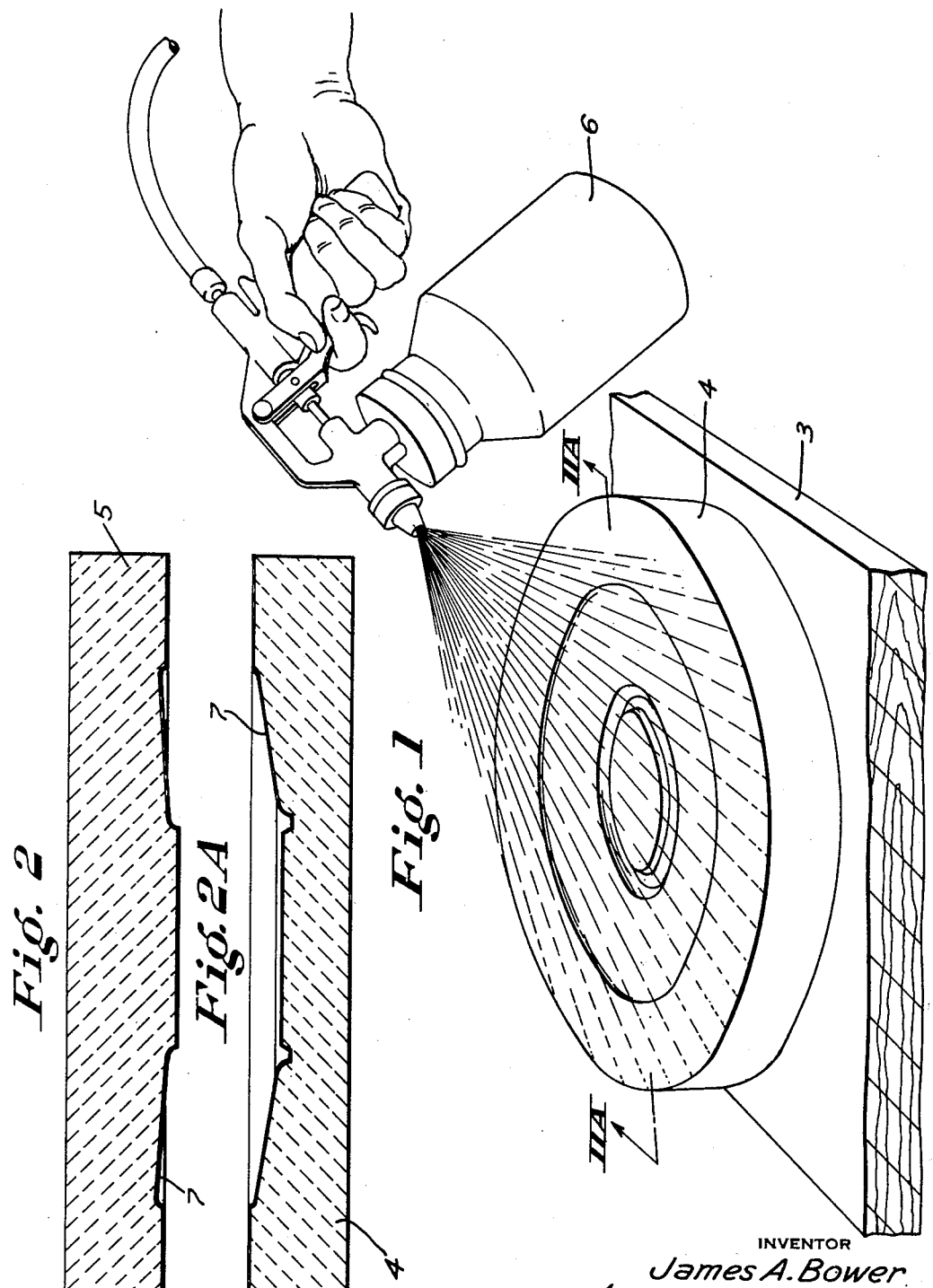
INVENTOR
James A. Bower Patented Feb. 21, 1950

2,498,149

UNITED STATES PATENT OFFICE 2,498,149

TREATMENT OF MOLDS FOR MAKING CERAMIC WARE

James A. Bower, Chester, W. Va., assignor to Taylor, Smith & Taylor Company, a corporation of Ohio Application April 30, 1946, Serial No. 666,195

9 Claims. (Cl. 25—156)

This invention relates generally to the production of ceramic articles and particularly to molds or molding surfaces employed in the production of such articles.

In the making of ceramic ware by conventional casting or jiggering operations, the clay or ceramic material is necessarily in intimate contact with a molding surface. The intimacy of this contact is made more apparent when it is understood that the usual practice involves the use of liquid-absorbing molds, i. e., molds made of material which is capable of taking up liquid, such as water, from the more or less fluid ceramic material or slip, during molding operation and which acts as a liquid absorbent during the operation of casting or molding the ceramic material. As a result of this intimate contact, difficulty is sometimes encountered in freeing the molded material (the green casting) from the molding surface or mold.

I have observed that the molding operations have a detrimental effect on the molding surfaces, thus shortening the effective life of molds and adding to the expense of production by the necessity of frequently replacing used molds by new ones. I have also discovered that the detrimental effect on the molding surfaces is occasioned, in large part, by the fact that the slip (ceramic material to be molded) chemically attacks the porous material of which the molds are made. This is due primarily to the fact that chemicals, such as soda ash and sodium silicate, are employed in the slip for the purpose of reducing its viscosity. That is to say, the liquid with which the clay is mixed, as a preliminary to the casting or molding operation, is alkaline to the extent that it attacks the material of which the molds or molding surfaces are formed. The magnitude of this attack is such as to appreciably effect the cost of producing ceramic articles because it necessitates the frequent replacing of old molds by new ones.

It has heretofore been assumed that the rapid depreciation of the molds was due to wear, such as results from rubbing surfaces, and attempts have been made to treat the molding surfaces in such a way as to reduce such wear but not with wholly satisfactory results. With the realization that wear may contribute to some extent to detrimental changes in the molding surfaces during molding operations, a broad or fundamental object of the present invention is to produce a molding surface which will eliminate, or at least minimize, the detrimental effect of molding operations on the molds and which will also contribute to the easy removal of the mold product from the mold, i. e., from the surface of the mold.

A further object is to produce a mold for the production of ceramic wear which has a high capacity for the absorption of liquid, such as water, and which is so formed as to provide a temporary, renewable surface that is attacked by the liquid filtering from the ceramic material in the mold and, in being attacked, minimizes the detrimental effect of such liquid on the mold, i. e., on the permanent surfaces of the mold.

A further object is to produce a procedure for so supplementing the surfaces of molds used in the casting of ceramic material, as to minimize the sticking of the molded products to the molding surfaces and prevent or minimize the etching effect and/or the wearing away of the molding surfaces, such as is now encountered in ceramic molding operations.

A further object is to produce a coating for molding surfaces, employed in connection with the molding of ceramic material, which will protect such surfaces from detrimental changes occasioned by chemical reaction and wear, but which will not reduce, or at least appreciably reduce, the liquid absorptive characteristics of the molds.

These and other objects are accomplished by employing molds, such as those now in use, which are made from material, such as plaster of Paris, and treating the molding surfaces thereof in such a way as to coat the same with a thin, uniformly distributed coating of a fine powder-like substance which contributes to the easy removal of the cast or molded articles from the molding surfaces and which has such chemical characteristics that it, like the material of which the molds are made, is subject to chemical attack by the liquid filtering from the slip during the molding operation. That is to say, my invention involves coating the molding surface or surfaces of a mold in such a way as to, in effect, cover the same with a temporary surface which contributes to the easy removal of the ceramic "green casting" from the mold and which is of such chemical characteristics that it reacts with the alkaline liquid, filtering from the ceramic material during the molding operation, in such a way as to prevent, or at least minimize, a chemical reaction between that liquid and the permanent molding surface or surfaces of the mold.

In the drawings forming a part hereof Figure 1 is a diagrammatic view illustrating a portion of a mold and procedure for applying a temporary coating thereto.

Figure 2 is a sectional view, as if taken along the line IIA—IIA of Figure 1 and illustrates a mold part adapted to cooperate with the mold part illustrated in Figure 1.

Figure 2A is a sectional view taken along the line IIA—IIA of the mold part illustrated in Figure 1.

Referring to Figure 1, a base or table 3 forms a support for a mold part 4 during the operation of applying a temporary coating to the molding surface thereof. The mold part 4 constitutes a part of a molding assembly which also includes a cooperating part 5, shown in Figure 2. It is the contemplation of this invention that the molding surfaces of molds, such as the mold made up of the parts 4 and 5, are provided with a temporary coating. Such a coating is diagrammatically illustrated at 7 in both Figures 2 and 2A. The preferred procedure for applying such a coating is diagrammatically illustrated in Figure 1, wherein a spraying mechanism 6 of conventional form is shown as discharging a spray onto the entire exposed face—including the molding surface—of the mold part 4. Each of the mold parts 4 and 5 are so formed that they are liquid absorbent, i. e., each is formed of some liquid absorbent material such as plaster of Paris and the contemplation is that parts when assembled enclose a mold cavity to which ceramic slip is delivered in the operation of molding a clay product.

In carrying out the invention, I preferably employ a substance such as uncalcined gypsum which is powdered in a pebble mill—or in any other suitable manner—to 140 mesh. The powdered material is then mixed with a liquid which wets it (and also wets the material of the mold) so as to make a mechanical solution. It is noted that water wets both the powdered material and the material of the mold and that I, therefore, employ water in making a solution in the proportions of about 40 grams of the powdered material to 100 cc. of water. The mold surface is then sprayed with the mechanical solution to the extent that a layer of powder, not to exceed about one thousandth of an inch in thickness, adheres to the molding surface. The spraying may be accomplished by an ordinary air spray device such as illustrated and under an air pressure of approximately ten pounds. The spraying of the surfaces of an ordinary mold may be accomplished in a matter of seconds but it is highly desirable that the sprayed coating be substantially uniform throughout the entire extent of the molding surfaces.

By mechanical solution I mean a mixture of powdered material and a wetting liquid, in which the material is so finely powdered that it hangs suspended in the liquid for a relatively long period of time.

In carrying forward my invention, I employ molds made from plaster of Paris. It is well established that such molds, when dry, have a high absorptive capacity for liquids, such as water, and they are capable of being employed effectively in the production of ceramic ware. I have, however, discovered that where the surfaces of such molds are coated with a coating material, such as described, the absorptive capacity of the molds is not appreciably reduced but the detrimental effect of the alkaline liquid on the mold surfaces is prevented or, at least, minimized to the extent that it is almost negligible.

I have also discovered that an effective coating material may be produced from old molds, i. e., from plaster of Paris, after the same has been treated with water and set into a hardened mass. The procedure involves powdering such material, in a pebble mill or otherwise, to about 140 mesh and then mixing it with water in the proportions above stated. It will be found that, whether the powder is produced from the material of old molds or from uncalcined gypsum, it is readily wet by water and, when comminuted to the extent noted, settles very slowly when thoroughly mixed with water. As a result mechanical solution of old mold material can be just as effectively used for the coating for molds as the uncalcined gypsum.

Each coating has about the same porosity as the plaster of Paris mold and, as above noted, does not appreciably affect the absorptive capacity of the mold.

In each case, the coating or temporary surface formed on the mold surface is attacked by the alkaline liquids filtering from the slip, but under conditions such as to neither detrimentally affect the permanent mold surfaces nor the products being molded. The reaction between the coating or temporary surface and the alkaline liquids seems to neutralize the liquids to the extent that they do not attack the material of which the molds are formed or at least do not attack that material to an appreciable extent.

By treating a mold as herein described, prior to each molding operation, its life is materially increased. Where the procedure is employed in connection with molding operations generally, it therefore results in a reduction in the cost of such operations. Because of this increase in mold life, it is economically feasible to make the walls of the molds heavier, thus increasing their strength and also their capacity for absorbing the liquids which constitute a part of the slip.

Where my invention is employed, the plaster of Paris molds are used in the ordinary manner, except for the surface coating operations. That is to say, the molds are dried out as a preliminary to each use and after the drying operation is completed, the temporary, protective coating is sprayed onto the mold surfaces. As above noted, the coating is extremely thin and substantially uniform throughout the extent of the mold surface and the spraying operation consumes very little time. The liquid mixed with the powdered material and sprayed onto the mold surface is immediately absorbed by the material of which the mold is formed, thus providing a temporary coating for the mold which is in condition for use almost immediately after the spraying operation.

It will be understood that the procedure here defined may be changed to some extent and that the materials employed in carrying forward the procedure may be varied and all without departing from the spirit and scope of my invention as defined by the appended claims.

What I claim is:

1. A method of molding ceramic articles and of protecting molding surfaces from the corrosive action of the liquid component filtering from ceramic material during molding operations, which consists in spraying onto said surfaces a mechanical solution in a wetting liquid of a finely powdered material, capable of reacting chemically with such liquid component and then delivering ceramic slip to the mold while the molding surface thereof is coated with such powdered material.

2. A method of molding ceramic articles and of minimizing the corrosive effect of the liquid component of ceramic slip on the surface of a mold during molding operations, which consists in spraying onto the molding surface of the mold a finely powdered substance, such as calcium sulphate, in mechanical solution in a wetting liquid and thereby coating the molding surface of said mold with such finely powdered material, and then delivering ceramic slip to the mold so treated while the coating of powdered material is in place on the molding surface thereof.

3. A method of molding ceramic articles and of minimizing the corrosive effect of the liquid component of ceramic slip on the surface of a mold during molding operations, which consists in spraying onto the molding surface of said mold a finely powdered uncalcined gypsum in mechanical solution with a liquid capable of wetting said powdered gypsum and the surface of said mold and thereby forming on such mold surface a uniform coating not more than one thousandth of an inch thick, and then delivering ceramic slip to the mold while the coating of finely powdered uncalcined gypsum is in place on the molding surface thereof.

4. As a new article of manufacture, a plaster of Paris mold for ceramic material having the molding surfaces thereof coated with a finely powdered material, consisting substantially of calcium sulphate.

5. As a new article of manufacture, a mold for ceramic material having a temporary coating on the molding surface thereof of finely powdered material, such as uncalcined gypsum.

6. A method of molding ceramic material in a plaster-of-Paris mold and of minimizing the corrosive effect on the molding surface of the mold of the liquid content of the ceramic slip delivered to the mold during the molding operation, which consists in drying the mold to develop its liquid absorbing capacity; coating the molding surface of the mold with a mechanical solution of powdered material and a liquid, under conditions such that liquid of said solution is absorbed by the mold and the molding surface is coated with a substantially uniformly distributed thin coating of finely powdered material; and then delivering ceramic slip to the mold while the coating of powdered material is in place on the molding surface thereof.

7. A method of molding ceramic material in a liquid absorbent, rigid mold and of minimizing the detrimental effect on the molding surface of the liquid content of the ceramic slip delivered to the mold, which consists in treating the mold to develop its liquid absorbing capacity; coating the molding surface of the mold with a mechanical solution of finely powdered material and water under conditions such that the water of the solution is absorbed by the mold and the molding surface thereof is coated with a substantially uniformly distributed thin film of substantially non-adherent powdered material; and then delivering ceramic slip to the mold while the molding surface thereof is coated with such film of powdered material.

8. A method of molding ceramic articles in a liquid absorbent mold and of minimizing the detrimental action of the ceramic slip on the molding surfaces of the mold, which comprises drying the mold to develop the water absorbing capacity thereof; spraying the molding surfaces of the mold with a mechanical solution of water and finely powdered non-adherent material which reacts chemically with the liquid component of such slip; and then delivering ceramic slip to the mold while the molding surfaces thereof are coated with such powdered material.

9. A method of molding ceramic articles in a liquid absorbent mold and of minimizing the detrimental action of the ceramic slip on the molding surfaces of the mold, which comprises drying the mold; spreading a substantially uniform thin film of a mechanical solution of water and a finely powdered material which reacts chemically with the slip in the same manner as the material of the mold reacts therewith; and then delivering ceramic slip to the mold while the molding surfaces thereof are coated with such finely powdered material.

JAMES A. BOWER.

REFERENCES CITED

The following references are of record in the file of this patent:

UNITED STATES PATENTS

| Number | Name | Date |
| --- | --- | --- |
| 156,793 | Hervier | Nov. 10, 1874 |
| 1,238,347 | Sebring et al. | Aug. 28, 1917 |
| 1,348,789 | Ehr | Aug. 3, 1920 |
| 2,410,390 | Paley | Oct. 29, 1946 |